United States Patent [19]
Wider et al.

[11] Patent Number: 6,071,334
[45] Date of Patent: Jun. 6, 2000

[54] PRINTING INK WITH HEAT STABILIZING AND LEVELING ADDITIVE

[76] Inventors: Michael Wider, #8 Hanover, Pleasant Ridge, Mich. 48069; Satyanarayana Nistala, 2002 Larimer Ct., Sugarland, Tex. 77479; James Lancaster, 245 Congaee-Apt. 1316, Greenville, S.C. 29607

[21] Appl. No.: 09/196,428

[22] Filed: Nov. 19, 1998

Related U.S. Application Data

[60] Provisional application No. 60/065,499, Nov. 19, 1997.

[51] Int. Cl.⁷ .................................................. C09D 11/00
[52] U.S. Cl. ..................................... 106/31.58; 106/31.43; 106/31.75; 106/31.86
[58] Field of Search .............................. 106/31.58, 31.86, 106/31.75, 31.43

[56] References Cited

U.S. PATENT DOCUMENTS

| | | | |
|---|---|---|---|
| 4,229,747 | 10/1980 | Hwang | 106/31.43 |
| 5,531,816 | 7/1996 | Wickramanayake | 106/31.86 |
| 5,565,022 | 10/1996 | Wickramanayake | 106/31.58 |
| 5,749,952 | 5/1998 | Tsang et al. | 106/31.86 |

*Primary Examiner*—Mark L. Bell
*Assistant Examiner*—Veronica F. Faison
*Attorney, Agent, or Firm*—Plunkett & Cooney, P.C.

[57] ABSTRACT

An aqueous ink jet ink composition used in an inkjet printhead is formulated with a colorant and a leveling agent that promotes the resolubilization of residual ink deposited on the printhead. The leveling agent is ethylene glycol phenyl ether. The ethylene glycol phenyl ether also functions as a heat stabilizer to reduce fluctuations in composition viscosity.

17 Claims, No Drawings

PRINTING INK WITH HEAT STABILIZING AND LEVELING ADDITIVE

CROSS REFERENCE TO RELATED APPLICATION

This application is a completion application of co-pending U.S. Provisional Application Ser. No. 60/065499 for "Heat Stabilizing Printing Ink Having Improved Properties and Heat Stability" filed Nov. 19, 1997, the disclosure of which is hereby incorporated by reference.

BACKGROUND OF THE INVENTION

The present invention pertains to printing inks. More particularly, the present invention pertains to printing inks used in ink jet applications. Even more particularly, the present invention pertains to additives used in ink jet printing formulations that provide heat stability and leveling.

As is known to those skilled in the art to which the present invention pertains, modern day, high speed printers use either drop-on demand (DOD) or continuous ink jet (CIJ) printing. Although both methods of printing are widely used today, they are very distinct technologies. In continuous ink jet printing, ink is supplied under pressure to a manifold region or area of a printer that distributes the ink to a plurality of orifices which are usually arranged in linear fashion. The ink discharges from the orifices in filaments which break into droplet streams. These droplet streams, then, have certain drops selectively charged and deflected from their normal trajectories. Printing or graphic reproduction is accomplished by depositing at least some of the selectively charged and deflected drops to a print receiving medium, while the other drops strike a drop catcher device. This technology is well known and well described in the literature. See, inter alia, U.S. Pat. No. 5,624,485.

The inks used in continuous ink jet printing are usually (lye-based and water-soluble. Such inks are developed with three criteria in mind, namely, water solubility, surface tension and viscosity.

The water solubility becomes extremely important with respect to the orifices and the manifold since the ink film on the printhead is allowed to dry when the printer is idle and must be leveled or resolubilized to reduce accumulation of ink on and in the orifices.

Ordinarily, continuous ink jet inks comprise a water-soluble polymer resin, a water-soluble dye as a colorant, a liquid carrier and water as a primary vehicle or carrier. Also, most dyes are blended with not only the above-noted ingredients, but other adjuvants including, for example, corrosion inhibitors, surfactants, biocides, humectants, etc., as well as mixtures thereof.

Today, many of the inks used in continuous ink jet printing also incorporate a polymeric fixing agent to impart waterfastness to the image formed on the substrate. One class of fixing agents is polyimine polymers based on N-hydroxy alkyl imine, wherein the alkyl portion is usually ethyl or propyl.

Ink jet inks may also utilize pigment-based colorants. As disclosed in U.S. Pat. No. 5,531,816 a pigment-based ink is formulated with at least one degglomerated pigment and a water-insoluble compound to reduce bleed and improve dry times. The use of large amounts of the water-insoluble compound necessitates formulation with at least one amphiphile.

Although current ink jet ink formulations offer waterfast inks that reduce bleed and have improved dry times, current ink jet ink frequently have misdirected jets presumably due to ink coagulation at the delivery orifice of the printhead. It has also been found, though, that the use of polyimine binders can further lead to problems with the jetting of inks due to misdirected jets.

It is hypothesized that jet malfunction is due to a plurality of causes including thickening of the ink as well as plugging of the orifice or encrustation of dried ink around the orifice causing the emerging ink stream to be misdirected. The art has therefore failed to suggest a water-based ink formulation that provides smooth film formation at the same time providing a continuous unrestricted flow of ink through the ink jet printhead orifice.

BRIEF SUMMARY OF THE INVENTION

In accordance herewith it has been found that by adding a certain leveling agent to the formulation, ink film on the printhead forms a level layer of dried ink that is more easily redissolved by the emerging stream of ink.

Additionally, it has been discovered that the leveling agent hereof defines a heat stabilizer at elevated temperatures with or without the presence of the imine. Similarly, the leveling agent hereof, also, enables the production of improved pigment-based continuous ink jet inks.

The specific leveling agent contemplated for use herein is a phenyl glycol ether and, in particular, an ethylene glycol phenyl ether. The ethylene glycol phenyl ether reduces surface tension to enable improved wetting of the substrate while having a penetrating ability which promotes adhesion to a porous substrate. The ether, per se, has a slow evaporation rate thereby allowing for high humidity conditions to exist in the printing plant.

For a more complete understanding of the present invention, reference is made to the following detailed description and accompanying examples.

DETAILED DESCRIPTION OF THE INVENTION

As stated above and in accordance herewith, it has been found that by adding ethylene glycol phenyl ether to an ink jet ink formulation, ink film on the printhead forms a level layer of dried ink that is more easily redissolved by the emerging stream of ink.

Ethylene glycol phenyl ether is a commercially available compound such as that sold by Dow Chemical under the name DALPAD® and in this commercial form is defined as a mixture of 90% ethylene glycol phenyl ether and 10% propylene glycol phenyl ether. However, it is the ethylene glycol phenyl ether which is the component that provides the improved leveling and resolublization. Moreover, it has been found that ethylene glycol phenyl ether is a powerful coalescing agent which allows for smooth film formation while preventing cracking and splintering of the resin.

Ethylene glycol phenyl ether has the following reported physical properties:

| PHYSICAL PROPERTIES | |
|---|---|
| Specific Gravity | 1.106–1.110 |
| Molecular Weight | 138.2 |
| Boiling Point (760 mmHg) | 245.6 |
| Flash Point (° F.) | 250 |
| Evaporation rate (BuAc-100) | <0.01 |

-continued

| PHYSICAL PROPERTIES | |
|---|---|
| Lb/Gal (25° C.) | 9.20 |
| Viscosity (25° C./cS) | 20.5 |
| Vapor Pressure (25° C./mmHg) | 0.007 |
| Surface Tension (dynes/cm) | 42.0 |
| Solubility in $H_2O$ (ml/100 mL $H_2O$) | 2.3 |
| in toluene | insol. |
| in naphthalene | insol. |
| Dipole Moment | 1.67 |

Heretofore the art has disclosed the use of a co-solvent system of a propylene glycol phenyl ether as a co-solvent, along with the aqueous carrier However, to the best of applicant's knowledge, ethylene glycol phenyl ether has not been suggested as a heat stabilizer and leveling agent to promote resolubilization on the printhead. In accordance herewith, the leveling agent is present in an amount ranging from about 0.05 to about 2%, by weight, based upon the weight of the composition, and, preferably, in an amount ranging from about 0.1 to less than about 1.0%, by weight, and more perferably from about 0.1 to 0.7% by weight.

As noted hereinabove, the incorporation of the leveling agent not only promotes resolubility at the orifices but also imparts heat stability to the ink.

Dye-based inks produced in accordance herewith, and as noted above, contain the is typical components used to prepare such continuous ink jet printing inks. Thus, such composition will include the colorant, i.e., the dye, in addition to the leveling agent and the above-noted carrier, corrosion inhibitors, etc.

The carrier for the ink is usually water. The water-soluble polymeric resin is usually a polymeric acid resin and/or a styrene acrylic-type polymer. The polymer functions as a dispersing agent for the dye. Generally, when used, the resin will be present in an amount ranging from about 0.1 to 4%, by weight, and, preferably, from about 0.1 to 1.0%, by weight. A base, such as an amine or alkanol amine, or buffer can be added to the composition to maintain the pH of the ink in a range of from about 7.0 to about 11.

As noted above, other components include a humectant; defoamer(s) such as acetylenic diols; surfactants, such as non-ionic surfactants; biocides, and corrosion inhibitors. The defoamer(s), when used, will be present in an amount ranging from about 0.05 to 0.50%, by weight, and, preferably, from about 0.05 to 0.2%, by weight. Likewise, the surfactants will, when used, be present in an amount ranging from about 0.05 to 2.0%, by weight, and, preferably, from about 0.05 to 1.0%, by weight. Similarly, an N-hydroxy alkylated imines may be included to improve water fastness. The presence or absence of the imine is not critical hereto. While the presence of the imine does evidence thickening of the ink about the orifices of printing heads the present invention minimizes such thickening.

Generally, when used, the biocide will be present in an amount ranging from about 0.05 to about 1.5%, by weight, and, preferably, in an amount of about 0.1% to about 0.5%, by weight. The buffer or base will be present in an amount ranging from about 0.1% to about 6.0%, by weight, and, preferably, from about 0.2 to about 4.0%, by weight. The humectant, when used, will be present in an amount ranging from about 0.1 to about 3.0%, by weight, and, preferably, in an amount ranging from about 0.5 to about 2.5%, by weight. Minor amounts of the corrosion inhibitor where used, will be present, ranging from about 0.1% to about 1%, by weight, and, preferably, from about 0.25 to about 0.75%, by weight. Usually, the dye solids will be present in an amount ranging from about 1.0 to about 7.0%, by weight, and, preferably, from about 2 to about 5%, by weight. Typically, the dye is added to the formulation as a dispersion containing minor amounts of other components similar to those hereinabove disclosed. All of the weights here are based upon the total weight of the composition with the balance of the composition comprising water. Typically the water is present in an amount greater than or equal to 66.0%.

It has been observed, at least regarding dye-based inks, that the ethylene glycol phenyl ether hereof improves resolubility, leveling and heat stability. The addition of ethylene glycol phenyl ether to some dye-based inks increases the resolubility of the ink by a factor of two. With respect to leveling, the ethylene glycol phenyl ether acts as a leveling agent. The incorporation of ethylene glycol phenyl ether into dye-based inks provides an ink which, upon drying, leaves a smooth continuous film. This ink does not pool or leave a ridge on surfaces. Dye-based inks without ethylene glycol phenyl ether leave a ridge on metal surfaces such as nickel surfaces used in ink jet orifice plates.

Also, the heat stability of dye-based inks is increased by the inclusion of ethylene glycol phenyl ether into ink formulations. Although not understood, it has been observed that the inclusion of the phenyl ether prevents the normally occurring viscosity increase occasioned with temperature increase, while reducing filtration time.

Similarly, it appears that with respect to pigmented inks, the ethylene glycol phenyl ether hereof improves resolubility and leveling. With respect to leveling, the ethylene glycol phenyl ether acts as a leveling agent, as described hereinabove, and when combined with pigmented inks provides an ink which, upon drying, leaves a smooth continuous film with a matte finish. This pigmented ink does not pool on metal surfaces or leave a ridge. Pigmented inks without ethylene glycol phenyl ether when dry tend to pool and leave a ridge on metal surfaces as do the dye-based inks.

Representative dyes and pigments used in the inks hereof, as well as inks prepared therefrom, are well known to the skilled artisan and have been widely reported in the art, such as is found, for example, in U.S. Pat. Nos. 5,605,566; 5,596,027; 5,514,208; 5,624,485; and so forth, the disclosures of which are hereby incorporated by reference.

In formulating a pigment-based ink, the pigment used will be present in an amount from about 1 to about 10% solids, by weight, and, preferably, from about 2 to about 6% solids, by weight. Such pigment-based inks will, also, include the other above-denoted components in amounts as noted in the prior art. Additionally, the ethylene glycol phenyl ether will be present in the amount indicated above.

For a more complete understanding of the present invention reference is made to the following illustrative examples. In the examples, all parts are by weight absent indications to the contrary.

EXAMPLE I

This example illustrates the preparation of a pigmented ink for use in a continuous ink jet printing process in accordance with the present invention.

At room temperature, and with mixing into a suitable container equipped with mixing means was added the below noted various components. Mixing occurred at the rate of about 1500 to 2000 rpm for a period of about thirty minutes to provide a homogenous mixture and to, also, test for foam formation.

In preparing the composition the following components were used:

| Ingredient | amt. pbw |
| --- | --- |
| Water | 68.0 |
| Dimethylethanolamine | 00.15 |
| Leveling Agent[1] | 1.01 |
| Pigment[2] | 30.00 |
| Defoamer I[3] | 00.14 |
| Defoamer II[4] | 00.06 |
| Corrosion Inhibitor[5] | 00.53 |
| Biocide[6] | 00.11 |
| | 100.00 |

[1] A 90:10 volumetric mixture of ethylene glycol phenyl ether and propylene glycol phenyl ether
[2] A commercially available 20% solids-containing aqueous carbon black dispersion
[3] An acetylenic diol blend defoamer having a molecular weight of 360 and a density of 8.3 lbs./gal @ 25° C.
[4] An acetylenic diol defoamer having a molecular weight of 210, having a specific gravity of 0.971 @ 25° C.
[5] A commercially available corrosion inhibitor
[6] A commercially available biocide from ICI Americas The so-prepared pigmented ink was, then, tested for physical parameters with the following observed properties:

| Physical Properties | |
| --- | --- |
| pH | 8.99 |
| Conductivity | 1.83 mS/cm |
| Surface Tension | 28.0 dynes/cm |
| Viscosity | 18.08 secs. (#1 shell cup) |
| color strength | 96 |
| % Waterfastness | 90% |
| Plate Properties | |
| no drying pattern | |
| 59 minutes till dry | |
| minor scraping, poor redissolvability | |

EXAMPLE II

Following the procedure of Example I a further pigmented ink was prepared from the following components:

| Ingredient | amt, pbw |
| --- | --- |
| Water | 66.09 |
| Dimethylethanolamine | 00.15 |
| Leveling Agent[1] | 01.00 |
| Pigment[2] | 30.00 |
| Defoamer I[3] | 00.10 |
| Defoamer II[4] | 00.06 |
| Corrosion Inhibitor[5] | 00.50 |
| Biocide[6] | 00.10 |
| Dispersing Agent[7] | 01.00 |
| Surfactant[8] | 01.00 |
| | 100.00 |

[1] Same as Example I
[2] Same as Example I
[3] Same as Example I
[4] Same as Example I
[5] Same as Example I
[6] Same as Example I
[7] A commercially available water-soluble styrenated acrylic resin sold by S.C. Johnson Polymer under the name Joncryl 678.
[8] An ethylene oxide-propylene oxide non-ionic surfactant.

The so-prepared pigmented ink was, then, tested for physical properties with the following observed properties:

| Physical Properties | |
| --- | --- |
| pH | 8.74 |
| Conductivity | 1.41 mS/cm |
| Surface Tension | 27.7 dynes/cm |
| Viscosity | 18.47 secs. (#1 shell cup) |
| color strength | 84 |
| % Waterfastness | 96% |
| Plate Properties (observed) | |
| less spread, heavy wick | |
| 13 minutes till dry | |
| will no scrape, acceptable redissolvability | |

From the above, the advantages of the leveling agent become apparent.

EXAMPLE III

Following the procedure of Example I a further pigmented ink was prepared from the following components:

| Ingredient | amt, pbw |
| --- | --- |
| Water | 66.09 |
| Dimethylethanolamine | 00.15 |
| Leveling Agent[1] | 00.50 |
| Pigment[2] | 30.00 |
| Defoamer I[3] | 00.10 |
| Defoamer II[4] | 00.06 |
| Corrosion Inhibitor[5] | 00.50 |
| Biocide[6] | 00.10 |
| Dispersing Agent[7] | 01.00 |
| Surfactant[8] | 01.50 |
| | 100.00 |

[1] Same as Example I
[2] Same as Example I
[3] Same as Example I
[4] Same as Example I
[5] Same as Example I
[6] Same as Example I
[7] Same as Example II
[8] Same as Example II The so-prepared pigmented ink was, then, tested for physical properties with the following observed properties:

| Physical Properties | |
|---|---|
| pH | 8.98 |
| Conductivity | 1.28 mS/cm |
| Surface Tension | 26.7 dynes/cm |
| Viscosity | 18.97 secs. (#1 shell cup) |
| color strength | 85 |
| % Waterfastness | 93% |
| Plate Properties | |
| heavy spread, heavy wick | |
| 13 minutes till dry | |
| will not scrape, acceptable redissolvability | |

EXAMPLE IV

Following the procedure of Example I a further pigmented ink was prepared from the following components:

| Ingredient | amt, pbw |
|---|---|
| Water | 66.00 |
| Dimethylethanolamine | 00.15 |
| Leveling Agent[1] | 01.50 |
| Pigment[2] | 30.00 |
| Defoamer I[3] | 00.10 |
| Defoamer II[4] | 00.06 |
| Corrosion Inhibitor[5] | 00.50 |
| Biocide[6] | 00.10 |
| Dispersing Agent[7] | 01.00 |
| Surfactant[8] | 00.50 |
| | 100.00 |

[1]Same as Example I
[2]Same as Example I
[3]Same as Example I
[4]Same as Example I
[5]Same as Example I
[6]Same as Example I
[7]Same as Example II
[8]Same as Example II The so-prepared pigmented ink was then tested for physical properties with the following observed properties:

| Physical Properties | |
|---|---|
| pH | 8.44 |
| Conductivity | 1.47 mS/cm |
| Surface Tension | 28.4 dynes/cm |
| Viscosity | 17.88 secs. (#1 shell cup) |
| color strength | 84 |
| % Waterfastness | 100% |
| Plate Properties | |
| minor spread, no wick | |
| 41 minutes till dry | |
| slight scrape, excellent redissolvability | |

As shown, at higher amounts of leveling agent the redissolvability of the ink is enhanced.

EXAMPLE V

This example illustrates the preparation of a dye-based ink for use in continuous ink jet printing process. Following the procedure of Example I, with stirring, an aqueous dye-based ink was prepared from the following ingredients:

| Ingredient | amt, pbw |
|---|---|
| Water | 75.64 |
| Dimethylethanolamine | 00.30 |
| Leveling Agent[1] | 00.30 |
| Defoamer I[2] | 00.06 |
| Defoamer II[3] | 00.10 |
| Corrosion Inhibitor[4] | 00.50 |
| Biocide[5] | 00.10 |
| Humectant[6] | 00.50 |
| Direct black dye[7] | 15.5 |
| IR readable black dye[8] | 07.00 |
| | 100.00 |

[1]Same as Example I
[2]Same as Example I
[3]Same as Example I
[4]Same as Example I
[5]Same as Example I
[6]A commercially available polymeric polyglycol having a molecular weight of about 500
[7]A commercially available 13% solids containing aqueous solution
[8]A commercially available 10% solid containing aqueous solution The so-prepared ink when tested, using the same test procedures as detailed before, had the following observed physical properties:

| Physical Properties | |
|---|---|
| Viscosity | 18.20 (#1 Shell Cup) |
| color strength | 91 |
| % Waterfastness | 82% |

EXAMPLE VI

The procedure of Example V was repeated to prepare an aqueous dye-based ink, with a decrease in the amount of the leveling agent from Example V. The following ingredients were used:

| Ingredient | amt, pbw |
|---|---|
| Water | 75.83 |
| Dimethylethanolamine | 00.30 |
| Leveling Agent[1] | 00.11 |
| Defoamer I[2] | 00.06 |
| Defoamer II[3] | 00.10 |
| Corrosion Inhibitor[4] | 00.50 |
| Biocide[5] | 00.10 |
| Humectant[6] | 00.50 |
| Direct black dye[7] | 15.50 |
| IR readable black dye[8] | 07.00 |
| | 100.00 |

[1]Same as Example I
[2]Same as Example I
[3]Same as Example I
[4]Same as Example I
[5]Same as Example I
[6]Same as Example V
[7]Same as Example V, present as 15.5 parts of a 13% solids solution
[8]Same as Example V, present as 7.0 parts of a 10% solids solution The so-prepared ink, when tested using the same test procedures as detailed before, had the following observed physical properties:

| Physical Properties | |
| --- | --- |
| Viscosity | 18.24 secs (#1 Shell Cup) |
| color strength | 91.1 |
| % Waterfastness | 80% |

The lower amount of leveling agent, thus, reduced the percent of waterfastness.

EXAMPLE VII

Using the below tested components, the procedure of Example V was repeated except that the amount of leveling agent was increased from that of Example V.

| Ingredient | amt, pbw |
| --- | --- |
| Water | 75.24 |
| Dimethylethanolamine | 00.30 |
| Leveling Agent[1] | 00.70 |
| Defoamer I[2] | 00.06 |
| Defoamer II[3] | 00.10 |
| Corrosion Inhibitor[4] | 00.50 |
| Biocide[5] | 00.10 |
| Humectant[6] | 00.50 |
| Direct black dye[7] | 15.50 |
| IR readable black dye[8] | 07.00 |
| | 100.00 |

[1]Same as Example I
[2]Same as Example I
[3]Same as Example I
[4]Same as Example I
[5]Same as Example I
[6]Same as Example V
[7]Same as Example V
[8]Same as Example V The so-prepared ink, when tested using the same test procedures as detailed before, had the following observed physical properties:

| Physical Properties | |
| --- | --- |
| Viscosity | 18.17 secs (#1 shell cup) |
| color strength | 91 |
| % Waterfastness | 84% |

With the increase of the amount of leveling agent, the percent of waterfastness increases.

EXAMPLE VIII

The procedure of Example V was repeated, using a different amount of leveling agent, but employing the following components, as follows:

| Ingredient | amt, pbw |
| --- | --- |
| Water | 75.44 |
| Dimethylethanolamine | 00.30 |
| Leveling Agent[1] | 00.50 |
| Defoamer I[2] | 00.06 |

-continued

| Ingredient | amt, pbw |
| --- | --- |
| Defoamer II[3] | 00.10 |
| Corrosion Inhibitor[4] | 00.50 |
| Biocide[5] | 00.10 |
| Humectant[6] | 00.50 |
| Direct black dye[7] | 15.50 |
| IR readable black dye[8] | 07.00 |
| | 100.00 |

[1]Same as Example I
[2]Same as Example I
[3]Same as Example I
[4]Same as Example I
[5]Same as Example I
[6]Same as Example V
[7]Same as Example V
[8]Same as Example V The so-prepared ink, when tested using the same test procedures as detailed before, had the following observed physical properties:

| Physical Properties | |
| --- | --- |
| Viscosity | 18.12 secs (#1 Shell Cup) |
| color strength | 90.0 |
| % Waterfastness | 83% |

The variance in the amount of leveling agent is seen to regulate the degree of waterfastness.

EXAMPLE IX

The procedure of Example V was repeated except that a dispersing agent was added to the composition and the amount of leveling agent was increased. The following ingredients and amounts were employed:

| Ingredient | amt, pbw |
| --- | --- |
| Water | 74.77 |
| Dimethylethanolamine | 00.30 |
| Leveling Agent[1] | 00.77 |
| Defoamer I[2] | 00.06 |
| DefoamerII[3] | 00.10 |
| Corrosion Inhibitor[4] | 00.50 |
| Biocide[5] | 00.10 |
| Dispersing Agent[6] | 00.50 |
| Humectant[7] | 00.50 |
| Direct black dye[8] | 15.50 |
| IR readable black dye[9] | 07.00 |
| | 100.00 |

[1]Same as Example I
[2]Same as Example I
[3]Same as Example I
[4]Same as Example I
[5]Same as Example I
[6]Same as Example II
[7]Same as Example V
[8]Same as Example V
[9]Same as Example V The so-prepared ink, when tested using the same test procedures as detailed before, had the following observed physical properties:

| Physical Properties | |
|---|---|
| pH | 9.54 |
| Conductivity | 4.39 mS/cm |
| Surface Tension | 32.8 dynes/cm |
| color strength | 1.38 |
| % Waterfastness | 43% |
| Viscosity | 18.43 sec (Shell Cup) |
| Plate Performance | acceptable |

EXAMPLE X

The procedure of Example V was repeated except that the dispersing agent, defoamers, biocide, corrosion inhibitor and humectant were eliminated to formulate a "basic" dye-based ink. The following ingredients and amounts were employed:

| Ingredient | amt, pbw |
|---|---|
| Water | 76.20 |
| Dimethylethanolamine | 00.30 |
| Leveling Agent[1] | 01.00 |
| Direct black dye[2] | 15.50 |
| IR readable black dye[3] | 07.00 |
| | 100.00 |

[1]Same as Example I
[2]Same as Example V
[3]Same as Example V

The so-prepared inks when tested, had the following observed physical properties:

| Physical Properties | |
|---|---|
| pH | 9.98 |
| Conductivity | 3.82 mS/cm |
| Surface Tension | 45.6 dynes/cm |
| color strength | 1.35 |
| % Waterfastness | 50% |
| Viscosity | 18.18 sec (#1 Shell Cup) |
| Plate Performance | acceptable |

EXAMPLE XI

Following the procedure of Example V, a dye-based print ink was prepared similar thereto except that the defoamers were eliminated therefrom and the amount of leveling agent was increased. The following ingredients and amount were thus employed:

| Ingredient | amt, pbw |
|---|---|
| Water | 75.10 |
| Dimethylethanolamine | 00.30 |
| Leveling Agent[1] | 01.00 |
| Corrosion Inhibitor[2] | 00.50 |
| Biocide[3] | 00.10 |
| Humectant[4] | 00.50 |
| Direct black dye[5] | 15.50 |
| IR readable black dye[6] | 07.00 |
| | 100.76 |

[1]Same as Example I
[2]Same as Example I
[3]Same as Example I
[4]Same as Example V
[5]Same as Example V
[6]Same as Example V The so-prepared ink, when tested using the same test procedures as detailed before, had the following observed physical properties:

| Physical Properties | |
|---|---|
| pH | 9.96 |
| Conductivity | 4.22 mS/cm |
| Surface Tension | 41.8 dynes/cm |
| color strength | 1.20 |
| % Waterfastness | 56% |
| Viscosity | 18.32 sec (#1 Shell Cup) |
| Plate Performance | decent, average |

The inclusion of the leveling agent, thus, is seen to impact the waterfastness and surface tension.

EXAMPLE XII

To test the effect of the ethylene glycol phenyl ether on aqueous-based dye-containing inks, a standard ink was prepared from the following components:

| Ingredient | amt, pbw |
|---|---|
| Water | 82.62 |
| Dimethylethanolamine | 00.30 |
| Dipropyleneglycol | 00.10 |
| Acetylenic Diol Defoamer | 00.15 |
| Corrosion inhibitor | 00.50 |
| Biocide | 00.10 |
| Acrylic resin, dispersing agent | 04.06 |
| 2-Butanol, as a humectant | 02.05 |
| Black dye, orient 1001[1] | 10.12 |
| | 100.00 |

[1]present as 10.12 parts of a 10% solids solution

To this base composition was then added, respectively, 0.2 parts of ethylene glycol phenyl ether; 0.4 parts of the glycol phenyl ether; 0.6 parts of the glycol phenyl ether, and; 0.8 parts of the glycol phenyl ether. The so-prepared compositions were, then, tested for physical properties. The following table sets forth the results of those tests, where compositions 1, 2, 3 and 4 refer to the 0.2 part; 0.4 part; 0.6 part and 0.8 part glycol phenyl ether additions, respectively.

| Pysical Property | Table Compositions | | | |
|---|---|---|---|---|
| | 1 | 2 | 3 | 4 |
| pH | 9.78 | 9.80 | 9.80 | 9.77 |
| Conductivity | 4.70 | 4.34 | 8.07 | 3,81 |
| Viscosity, sec (#1 Shell Cup) | 17.92 | 18.15 | 18.04 | 17.93 |
| SST | 33.5+/−0.3 | 33.4+/−0.3 | 33.4+/−0.3 | 33.2+/−0.2 |
| Color Strength | 82.8 | 84.4 | 83.7 | 81.4 |
| % Waterfastness | 37.2 | 39.8 | 40.4 | 42.6 |
| Foam | 150:30:2 | 150:10:2 | 85:5:2 | 120:10:2 |
| Plate Performance | 1 | 1 | 1 | 1 |
| | All redissolve very well | | | |
| Dry time on steel, min | 4 | 3 | 2 | 1 |

From the above it is to be seen that the addition of the ethylene glycol phenyl ether to either the pigmented ink or the dye ink does not detract from the quality of the ink, itself Moreover, the glycol phenyl ether, as a leveling agent improves the resolubility of the dye-based inks, enables the formation of a pigmented ink and enhances the heat stability at 148° F. of the dye-based inks.

EXAMPLE XIII

This example illustrates the superior redissolvability of pigmented inks with ethylene glycol phenyl ether incorporated therein using the well-known swab test. On a stainless steel surface, 10 microliters of a pigmented ink prepared according to Example I, was spread, at room temperature, in an oval, approximately ½ inch on the minor axis by 1 inch on the major axis. When the ink was dry, a cotton swab was placed in water and dragged though the ink sample until the ink was redissolved, at which point the test was complete resolubility of the pigmented ink, occurred within 5 seconds.

When the tests were repeated with a swab placed in a dry ink sample without the glycol phenyl ether incorporated thereinto, several passes were necessary to redissolve the ink.

EXAMPLE XIV

This example further illustrates the superior redissolvability or resolubility of pigmented inks combined with ethylene glycol phenyl ether using the well-known "adjacent drop" test.

On a stainless steel surface, 10 microliters of pigmented ink according to Example 1, was spread, at room temperature, in an oval, approximately ½ inch on the minor axis by 1 inch on the major axis. When the ink was dry, a drop of water was placed directly next to the ink surface. After 5 seconds, an absortive tissue was used to blot the ink. This test was then repeated with another pigmented ink, but which did not contain the glycol phenyl ether. The following results were observed:

| Test Ink | Results |
|---|---|
| Pigmented ink with ethylene glycol phenyl ether | complete ink wetting after 5 seconds with no residue left on the plates |
| Pigmented ink without ethylene glycol phenyl ether | incomplete wetting after 5 seconds with residue left on the plates |

EXAMPLE XV

This example further illustrates the superior redissolvability of pigmented inks containing ethylene glycol phenyl ether using the "direct drop" test. On a stainless steel metal surface, a pigmented ink prepared according to Example I, 10 microliters of the ink was spread, at room temperature, in an oval approximately ½ inch on the minor axis by 1 inch on the major axis. When the ink was dry, a drop of water was placed directly on the dry ink sample. After 5 seconds, an absorptive tissue was used to blot the ink. This procedure was, then, repeated using another ink that did not contain the glycol phenyl ether. The following results were observed:

| Test Ink | Results |
|---|---|
| Pigmented ink with ethylene glycol phenyl ether[1] | complete ink wetting after 5 seconds with no residue left on the plates |
| Pigmented ink without ethylene glycol phenyl ether[2] | no residue left on the plates |

[1]A commercially available black ink to which is added 0.1 to 3.0 parts of glycol phenyl ether.
[2]The same as (1), without the glycol phenyl ether.

EXAMPLE XVI

This example illustrates the superior redissolvability of various commercial dye-based inks combined with ethylene glycol phenyl ether over those without the glycol phenyl ether. To test the efficacy of the present invention with dye-based inks, the procedure of Example XIII was repeated except that dye-based inks were tested in place of pigmented inks.

| Test Ink | Number of passes to redissolve the ink sample |
|---|---|
| Dye-based non-security ink[1] | 2 |
| Dye-based security[2] | 2 |
| Dye-based non-security ink[3] | 4 |
| Dye-based security ink[4] | 4 |

[1]A commercially available non-security black ink to which is added 1 part of ethylene glycol phenyl ether per 99 parts of ink.
[2]A commercially available security ink to which is added 1 part of ethylene glycol phenyl ether per 99 parts of ink.
[3]Same as (1), but without the glycol phenyl ether.
[4]Same as (2), but without the glycol phenyl ether.

EXAMPLE XVII

This example further illustrates the superior redissolvability of dye-based inks combined with ethylene glycol phenyl ether over those without the glycol phenyl ether. According hereto, the procedure of Example XIV was repeated except that dye-based inks were tested in place of pigmented inks.

| Test Ink | Results |
| --- | --- |
| Dye-based non-security ink[1] | no residue left |
| Dye-based security ink[2] | no residue left |
| Dye-based non-security ink[3] | residue left |
| Dye-based security ink[4] | residue left |

[1]Same as Example XVI
[2]Same as Example XVI
[3]Same as Example XVI
[4]Same as Example XVI

EXAMPLE XVIII

This example further illustrates the superior redissolvability of dye-based inks combined with ethylene glycol phenyl ether over those without the glycol phenyl ether. The procedure of Example XV was repeated except that dye-based inks were tested in place of pigmented inks.

| Test Preparation | Results |
| --- | --- |
| Dye-based non-security ink[1] | no residue left |
| Dye-based security ink[2] | no residue left |
| Dye-based non-security ink[3] | residue left |
| Dye-based security ink[4] | residue left |

[1]Same as Example XVI
[2]Same as Example XVI
[3]Same as Example XVI
[4]Same as Example XVI

EXAMPLE XIX

This example illustrates the superior visual appearance achieved with an ink having ethylene glycol phenyl ether added thereto, whether pigmented or dye-based, using the well-known "lay on the plate" test.

On a stainless steel surface, 10 microliters of ink was spread, at room temperature, in an oval approximately ½ inch on the minor axis by 1 inch on the major axis. When the ink had dried, a visual assessment was made. The observed results were as follows:

| Test Ink | Results |
| --- | --- |
| ink sample without ethylene glycol phenyl ether | ink tended to pool on the surface ink left a ridge on the plate which is difficult to redissolve and the film layer was not uniform and had a shiny oily appearance |
| ink sample with ethylene glycol phenyl ether | ink did not pool on the surface; ink did not leave a ridge on the plate; and a continuous film with a matte finish was formed on the surface of the plate. |

EXAMPLE XX

This example illustrates the increased heat stability of dye-based inks having combined ethylene glycol phenyl ether added thereto.

Samples of dye-based inks with ethylene glycol phenyl ether with and without ethylene glycol phenyl ether were prepared and placed in an oven for a period of 6 days maintained at 140° F. After the 6 day period, the samples were filtered through a 1 micron, a 0.65 micron and a 0.22 micron filter paper.

| Test Ink | Results |
| --- | --- |
| Dye-based security ink and dye-based non-security ink with ethylene glycol phenyl ether | filtered though the 1 micron, 0.65 micron and 0.22 micron filter papers. |
| Dye-based non-security ink without glycol phenyl ether | filterable for both the 1 micron and ethylene the 0.65 micron filter papers, but was unfilterable through the 0.22 micron filter paper. |
| Dye-based security ink without ethylene glycol phenyl ether | filtered though the 1 micron and 0.65 micron filter papers, but was unfilterable through the 0.22 micron filter paper. |

From the preceding, it is to be appreciated that the incorporation of ethylene glycol phenyl ether into a dye-based and/or pigment-based ink compositions, enhances the properties of both inks over those presently commercially available in both heat stability and leveling.

What is claimed is:

1. A continuous ink jet ink, comprising:
   (a) a colorant;
   (b) a leveling agent; and
   (c) water, wherein the leveling agent is ethylene glycol phenyl either present in an amount of about 0.05 wt % to about 0.7 wt %, based on the total weight of the ink composition.

2. The ink jet ink composition of claim 1 wherein the leveling agent is present in an amount of about 0.05 wt % to about 1.0 wt % based on the total weight of the ink composition.

3. The ink jet ink composition of claim 1 wherein the water is present in an amount equal to or greater than about 66.0 wt % to about 98.95 wt % based on the total weight of the ink composition.

4. The ink jet composition of claim 2 wherein the colorant is a pigment-based colorant.

5. The ink jet composition of claim 4 wherein the ink jet composition contains pigment solids in a range from about 1.0% to about 10.0% solids per weight based on total weight of the ink composition.

6. The ink jet ink composition of claim 5 wherein the ink composition further includes:
(a) a surfactant in an amount of about 0.05 wt % to about 2.0 wt % based on the total weight of the ink composition;
(b) a buffer in an amount of about 0.1 wt % to about 6 wt % based on the total weight of the ink composition;
(c) a humectant in an amount of about 0.1 wt % to about 3 wt % based on the total weight of the ink composition;
(d) a defoamer in an amount of about 0.05 wt % to about 0.5 wt % based on the total weight of the ink composition;
(e) a biocide in an amount of about 0.05 wt % to about 1.5 wt % based on the total weight of the ink composition; and
(f) a corrosion inhibitor in an amount of about 0.1 wt % to about 1.0 wt % based on the total weight of the ink composition.

7. The ink jet ink composition of claim 5 wherein the ink composition further includes an n-hydroxy alkylated imine.

8. The ink jet ink composition of claim 1 wherein the colorant is a dye-based colorant.

9. The ink jet ink composition of claim 8 wherein the water is present in an amount greater than or equal to about 66.0 wt % up to about 98.95 wt % based on the total weight of the ink composition.

10. The ink jet ink composition of claim 9 wherein the ink further includes an n-hydroxy alkylated imine.

11. The ink jet ink composition of claim 9 wherein the ink composition further comprises:
(a) a dispersant in an amount of about 0.1 wt % to about 4 wt % based on the total weight of the ink composition;
(b) a surfactant in an amount of about 0.05 wt % to about 2 wt % based on the total weight of the ink composition;
(c) a humectant in an amount of about 0.1 wt % to about 3 wt % based the total weight of the ink composition;
(d) buffer in an amount of about 0.1 wt % to about 6 wt % based on the total weight of the ink composition;
(e) a defoamer in an amount of about 0.05 wt % to about 0.5 wt % based on the total weight of the ink composition;
(f) a biocide in an amount of about 0.05 wt % to about 1.5 wt % based on the total weight of the ink composition; and
(g) a corrosion inhibitor in an amount of about 0.1 wt % to about 1.0 wt % based on the total weight of the ink composition.

12. The dye-based ink jet ink composition of claim 11, wherein the ink further comprises an n-hydroxy alkylated imine.

13. A method of heat stabilizing and leveling a water-based ink in an ink jet print head comprising:
(a) adding less than 1.04 wt % ethylene glycol phenyl ether leveling agent to a water-based ink jet ink to form an ink composition, wherein water is present in an amount greater than or equal to about 66.0 wt % up to about 98.05% based on the total weight of the ink composition;
(b) placing the ink composition in a chamber of an ink jet printhead, the ink jet printhead having an orifice;
(c) operating the printhead to deposit the ink composition upon a print surface,
(d) allowing the printhead to go idle and the ink composition to substantially dry at the orifice; and
(e) restarting the printhead, wherein the ink composition stored in the chamber of the printhead redissolves the substantially dried ink composition at the orifice.

14. The method of claim 13 wherein the ethylene glycol phenyl ether is present in an amount of from 0.05 wt % to about 0.7 wt % based on the total weight of the ink composition.

15. The method of claim 13 wherein operating the printhead to deposit the ink composition upon a print surface is by continuous ink jet printing.

16. The method of claim 13 wherein the ink composition is a dye-based ink composition.

17. A continuous ink jet ink composition, comprising:
(a) a colorant;
(b) ethylene glycol phenyl ether leveling agent present in an amount of less than 1% by weight, based on the total weight of the ink composition, and
(c) water.

* * * * *